US008369657B2

(12) United States Patent
Chan et al.

(10) Patent No.: US 8,369,657 B2
(45) Date of Patent: Feb. 5, 2013

(54) SELECTING WIDER BANDWIDTH CHANNELS IN A WIRELESS NETWORK

(75) Inventors: Douglas Chan, San Jose, CA (US); Brian Donald Hart, Sunnyvale, CA (US); Bretton Douglas, Bloomington, IL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/412,717

(22) Filed: Mar. 6, 2012

(65) Prior Publication Data

US 2012/0163331 A1 Jun. 28, 2012

Related U.S. Application Data

(63) Continuation of application No. 12/165,717, filed on Jul. 1, 2008, now Pat. No. 8,155,482.

(60) Provisional application No. 60/971,784, filed on Sep. 12, 2007.

(51) Int. Cl.
*G06K 9/54* (2006.01)
*H04J 1/00* (2006.01)
(52) U.S. Cl. ......................... 382/305; 370/343
(58) Field of Classification Search .................. 382/305, 382/100; 370/310, 312, 343, 352, 410, 329; 455/255, 258, 446, 464
See application file for complete search history.

(56) References Cited

U.S. PATENT DOCUMENTS

| | | | |
|---|---|---|---|
| 6,044,090 A * | 3/2000 | Grau et al. | .................... 370/485 |
| 6,829,486 B2 | 12/2004 | McKenna et al. | |
| 7,280,607 B2 | 10/2007 | McCorkle et al. | |
| 7,363,008 B2 | 4/2008 | Hassan et al. | |
| 7,372,866 B2 | 5/2008 | Jang et al. | |
| 7,558,592 B2 | 7/2009 | Hart et al. | |
| 7,593,356 B1 | 9/2009 | Friday et al. | |
| 2003/0054827 A1 | 3/2003 | Schmidl et al. | |

FOREIGN PATENT DOCUMENTS

| | | |
|---|---|---|
| WO | 2006045097 A2 | 4/2006 |
| WO | 2006069176 A2 | 6/2006 |
| WO | 2006045097 A3 | 8/2006 |

OTHER PUBLICATIONS

IEEE, "IEEE P802.11n/D2.00 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment: Enhancements for Higher Throughput," Feb. 2007.
Akin, Devin, "802.11n 20/40 MHz BSS Mode Rules," CWNP Wireless Certification and Wireless Training, Aug. 29, 2007.
International Search Report and Written Opinion in International Application No. PCT/US2008/075555, dated Feb. 3, 2009.

* cited by examiner

*Primary Examiner* — Yon Couso
(74) *Attorney, Agent, or Firm* — Edell, Shapiro & Finnan, LLC

(57) ABSTRACT

Techniques are provided for selecting channels for a wider bandwidth operation mode of a wireless network, such as wireless network that operates in accordance with the IEEE 802.11n amendment. Alignments of so-called primary and secondary channels are selected to mitigate interference. Interfering sources, such as other transceivers or external interferers, or the energy from their transmissions, are identified and channels are selected. The selected channels are analyzed to determine whether primary-secondary channel assignments for the selected channels are feasible.

27 Claims, 6 Drawing Sheets

SELECTING WIDER BANDWIDTH CHANNELS IN A WIRELESS NETWORK

CROSS REFERENCE TO RELATED APPLICATIONS

This application is a continuation application of U.S. patent application Ser. No. 12/165,717, filed Jul. 1, 2008, which claims priority to U.S. Provisional Application No. 60/971,784, filed Sep. 12, 2007, the entirety of both of which are incorporated herein by reference.

TECHNICAL FIELD

The present disclosure relates generally to channel selection for wireless communication such as wireless networks.

BACKGROUND

Increasing spectral bandwidth is one way to increasing channel capacity in telecommunications. For example, in order to increase channel capacity, the Institute of Electrical and Electronics Engineers (IEEE) amendment known as 802.11n for wireless local area network (WLAN) communication introduced allocating to a wireless network the combined bandwidth of two adjacent (contiguous) 20 MHz channels to provide 40 MHz of bandwidth. The wider bandwidth mode of operation of the wireless network is useful to achieve higher data rates. In the wider bandwidth mode, one channel is referred to as the primary channel and the other channel is referred to as the secondary channel.

Due to asymmetric channel access rules, wireless network devices using a 40 MHz operation mode have an unfair advantage under the rules of the IEEE 802.11n amendment. For example, according to the rules of IEEE 802.11n amendment, the secondary channel only has to be clear or free from transmissions during a time interval known as the Point Coordination Function Interframe Spacing (PIFS) instead of the longer time interval known as a Distributed Interframe Spacing (DIFS); or that backoff rules reflect the congestion level of the primary channel but are relatively insensitive to the congestion level of the secondary channel; or that reservation mechanisms on the secondary channel may be ignored; or that there are more relaxed Clear Channel Assessment (CCA) rules governing access to the secondary channel. These factors can allow devices operating in 40 MHz to cause unfair interference to those 20 MHz devices operating on the secondary channel.

DESCRIPTION OF EXAMPLE EMBODIMENTS

Overview

Figure 1:
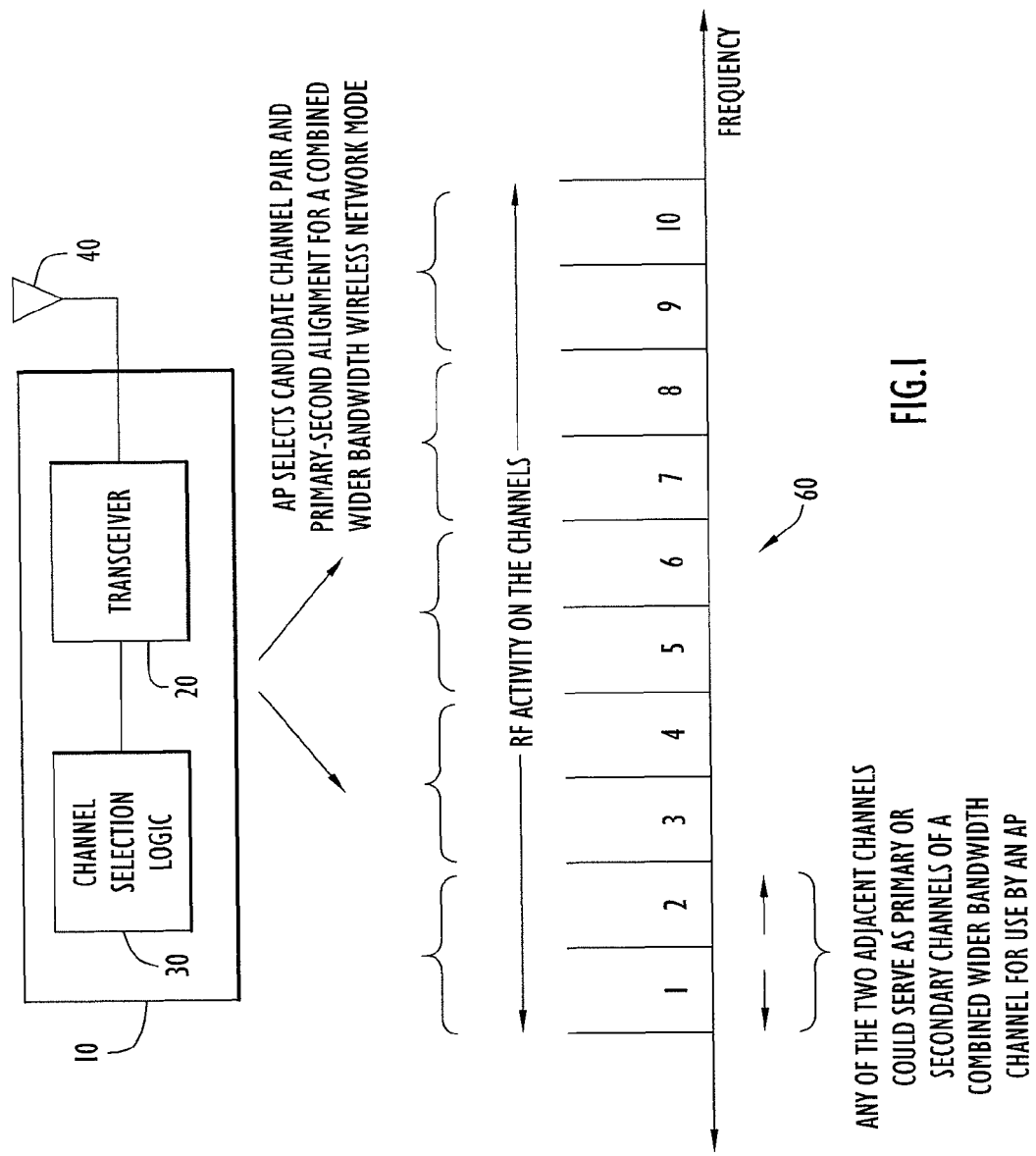
FIG. 1 is a FIG. 1 is a diagram illustrating an example of a wireless network device selecting adjacent channels for a wider bandwidth operation mode.

Generally, according to one example embodiment, a method is provided in which metrics are computed for one or more sets of radio frequency (RF) channels. Each set comprises at least two contiguous RF channels in a frequency band that may be selected for use by a wireless network for a wider bandwidth mode of operation that combines bandwidth of two or more contiguous RF channels, wherein the metrics are based on activity from other devices in the set of RF channels. Alignment of individual primary and secondary RF channels in a particular set of RF channels for operation of the wireless network in the wider bandwidth mode is determined with respect to RF channels in the frequency band in which other wireless devices may be operating. As described hereinafter, a primary channel is a set of one or more RF channels that is the lowest denomination or smallest number of RF channels that a device operating in the wider bandwidth mode can fall back or revert to when it decides the wider bandwidth mode is not advantageous to use for an impending transmission, or in other words is otherwise not useful. Thus, a primary channel is a set of one or more RF channels that is the lowest denomination of RF channels that a device uses when it is not operating in the wider bandwidth mode and a secondary channel is one or more RF channels adjacent to a primary or secondary channel.

For example, in an 802.11n basic service set (BSS) capable of operating in a 20 MHz mode or a 40 MHz wider bandwidth mode, devices can switch back and forth between using just the primary channel (20 MHz) or both a primary and a secondary channel (40 MHz) whenever they wish. A secondary channel is a channel or a set of channels that is adjacent to a primary channel or secondary channel and whose bandwidth can be combined with the primary channel(s) and secondary channel(s) to achieve the wider bandwidth mode of operation. Access rules for when a device can use the secondary channel(s) in order to have wider bandwidth mode capability are usually, but not necessarily, more relaxed than the rules for determining when the primary channel can be used. Moreover, a primary channel may also be the channel on which control signals/data are sent, e.g., channel reservation, whereas this control information may only be optionally sent on the secondary channel.

According to another example embodiment, a method is provided where one or more candidate sets of two or more contiguous RF channels that are available for use by a wireless network in a wider bandwidth mode of operation are identified. In the wider bandwidth mode, the two or more contiguous RF channels are combined for use in/for a single wider bandwidth channel. Metrics are computed for the one or more candidate sets of RF channels, wherein the metrics are based on activity from other devices on RF channels in a set. A candidate set of RF channels is selected for use by the wireless network in the wider bandwidth mode of operation based on the metrics computed for all of the candidate sets of RF channels.

Further still, techniques are provided herein to enable a wireless network operating on only one RF channel to select an RF channel in the presence of at least one wireless network that operates in a wider bandwidth mode using at least two contiguous RF channels. Metrics are computed for RF channels in a frequency band where at least one existing wireless network operates using at least two contiguous RF channels, wherein the metrics are based on activity from other devices in the set of RF channels. Assignment of the wireless network to one of the RF channels is based on the metrics and so as to coexist with the existing wireless network that operates in the wider bandwidth mode using at least two contiguous RF channels, in a manner that attempts to maximize performance of the wireless networks.

According to the example embodiments described, a device, method and instructions encoded on a computer readable medium are provided herein for selecting channels for a wider bandwidth mode of operation in a wireless network, where the rules for accessing channels in the wireless network allow for selection of two (or more) contiguous channels. One example of such access rules are those devised by the IEEE 802.11n amendment that specifies 20/40 MHz transceiver and primary-secondary channel alignments to mitigate interference in an unlicensed frequency band. Interfering sources, such as other wireless network transceiver devices or wireless other-network interferer devices, or the energy from their transmissions, are identified in the course of making selections of candidate channel pairs. Furthermore, a selected candidate channel pair is analyzed to determine whether primary-secondary channel assignments of the selected candidate channel pair are feasible and fair.

Described in an example embodiment herein, is an apparatus configured to select channels for a wide spectral bandwidth system, such as an 802.11n 20/40 MHz transceiver. The apparatus is also configured to select primary/secondary channel alignments to mitigate interference.

The example embodiments described herein refer to an 802.11n compatible wireless network. This is for ease of illustration as it should be readily appreciated that the principles described herein are suitably adaptable to any wireless network employing multiple channel communications to increase spectral bandwidth (referred to herein as a wider bandwidth network operation mode).

The following are definitions of certain terminology used throughout this description:

The term "BSS" refers to a basic service set and it denotes, for example, a single 802.11 wireless network, e.g., one access point (AP) and multiple association client devices.

The term "20/40-BSS" refers to a BSS that allows both single channel operation (e.g., 20 MHz) and the wider bandwidth operation (e.g., 40 MHz) by using two or more adjacent (contiguous channels). Thus, a 20/40 BSS is a wireless network that allows a wider bandwidth operation mode.

The term "20-BSS" refers to a BSS that allows only single channel operation (e.g., 20 MHz).

The term "channel cost metrics" refers to metrics for a candidate channel that are described herein and which can depend on noise, radio interferences, traffic loads, regulatory class, dynamic frequency selection (DFS) rule, etc.

Tables 1 and 2 below list some of the channel numbers and their corresponding center frequency for the 20 MHz and 40 MHz channels, respectively, available in the 5 GHz frequency band for operation by devices according to the rules of the IEEE 802.11 standard.

TABLE 1

| Channel Number | Channel's center frequency in GHz |
| --- | --- |
| 34 | 5.170 |
| 36 | 5.180 |
| 38 | 5.190 |
| 40 | 5.200 |
| 42 | 5.210 |

TABLE 1-continued

| Channel Number | Channel's center frequency in GHz |
| --- | --- |
| 44 | 5.220 |
| 46 | 5.230 |
| 48 | 5.240 |
| 52 | 5.260 |
| 56 | 5.280 |
| 60 | 5.300 |
| 64 | 5.320 |

TABLE 2

| Channel Number Pair | Channel's center frequency in GHz |
| --- | --- |
| 36, 40 | 5.190 |
| 44, 48 | 5.230 |
| 52, 56 | 5.270 |
| 60, 64 | 5.310 |
| 116, 120 | 5.590 |
| 157, 161 | 5.795 |

In general, the two or more contiguous RF channels that are combined to form the one wider bandwidth channel are referred to herein as a set of RF channels. A set of RF channels may comprise two or more contiguous RF channels. In the examples described herein in which the set comprises two adjacent RF channels, the set is referred to as a "pair" or channel pair. When a wireless device initiates use of the frequency band in this wider bandwidth mode, the individual RF channels that are combined to form the one wider channel are designated either a primary channel or a secondary channel depending on activity from other wireless networks on the channels. While the following description refers to the example where a set comprises two contiguous channels, e.g., a channel pair, this is not meant to be limiting and the techniques described herein can generally be employed when selecting and aligning a set of (two or more) contiguous channels for use in a wider bandwidth mode of operation.

FIG. 1 generally illustrates a wireless network device 10, such as an AP, that comprises a wireless transceiver 20 and channel selection logic 30. The transceiver 20 connects to an antenna 40 that detects received signals and emits signals. The device 10 is configured to receive signals from other devices and transmit signals to other devices on one channel in a normal single channel mode or on two (or more) contiguous channels in a wider bandwidth mode. For example, FIG. 1 illustrates a frequency band 60 comprising 10 non-overlapping channels labeled channels 1-10. In the wider bandwidth mode, the device 10 selects a candidate pair of contiguous channels (called a candidate channel pair) and performs channel alignment analysis to determine which of the channels in the candidate channel pair is a primary channel and which is a secondary channel. As indicated in FIG. 1, any of the two adjacent channels can serve as primary or secondary channels of a channel pair for the wider bandwidth operation mode.

Figure 5:
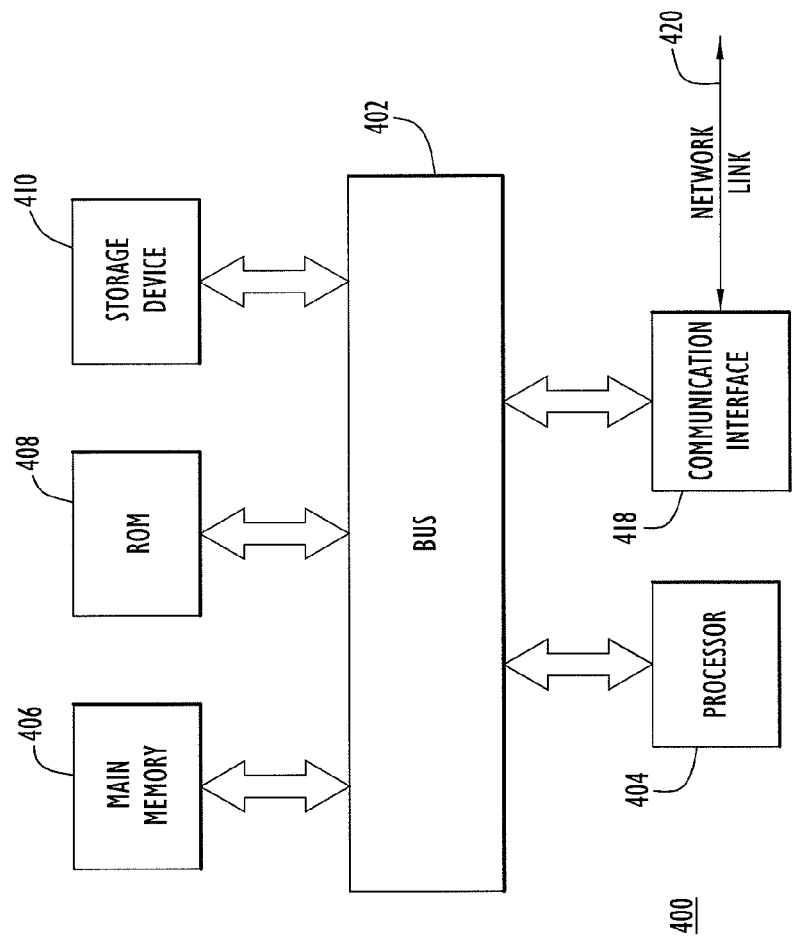
FIG. 5 is a block diagram of a computing device upon which an example embodiment may be implemented.

The device 10 is suitably adapted to be implemented within an AP or within an AP controller as illustrated in FIG. 5, described hereinafter. The term "logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

Channel selection logic 30 is in data communication with the transceiver 20. Transceiver 20 is configured to acquire data on existing BSS's or observed external interferers. For example, if device 10 is implemented in an AP, transceiver 20 can be a wireless transceiver configured to listen for beacons, signals, noise, etc. on the available channels. Transceiver 20 communicates data to channel selection logic 30 indicating the observed conditions, enabling channel selection logic 30 to select candidate channels. As another example, if device 10 is implemented in an AP controller, transceiver 30 can be configured to acquire data from several APs to which it is connected.

In an example embodiment, candidate channels are communicated to channel selection logic 30 via transceiver 20. Channel selection logic 30 is responsive to determine whether the device 10 can operate on the candidate channels and configure channel alignment employing any of the methods and rules described herein. For example, if device 10 is operating on an 802.11n network, channel selection logic can determine if there is an existing 20/40 MHz BSS on the candidate channels, then the device 10 ensures that the primary channel of the new BSS is identical to the primary channel of any existing 20 MHz BSS or 20/40 MHz BSS and that the secondary channel of the new 20/40 MHz BSS is identical to the secondary channel of any existing 20/40 MHz BSS(s), unless the device 10 discovers that on these two channels is another existing 20/40 MHz BSS with different primary and secondary channels or another existing 20 MHz BSS not on the primary channel.

Channel selection logic 30 can be further configured so that the device 10 uses a pair of channels such that the secondary channel corresponds to a channel on which no beacons from any existing 20 MHz BSS(s) have been detected. If a pair of channels cannot be found without an existing 20 MHz BSS, then channel selection logic 30 is configured so that the device 10 uses a pair of channels such that the secondary channel corresponds to a channel on which no beacons from any existing 20 MHz BSS(s) above a predetermined RSSI threshold, for example −90 dBm have been detected. In an example, channel selection logic 20 implements method 100 described hereinafter in connection with FIG. 2.

Figure 2:
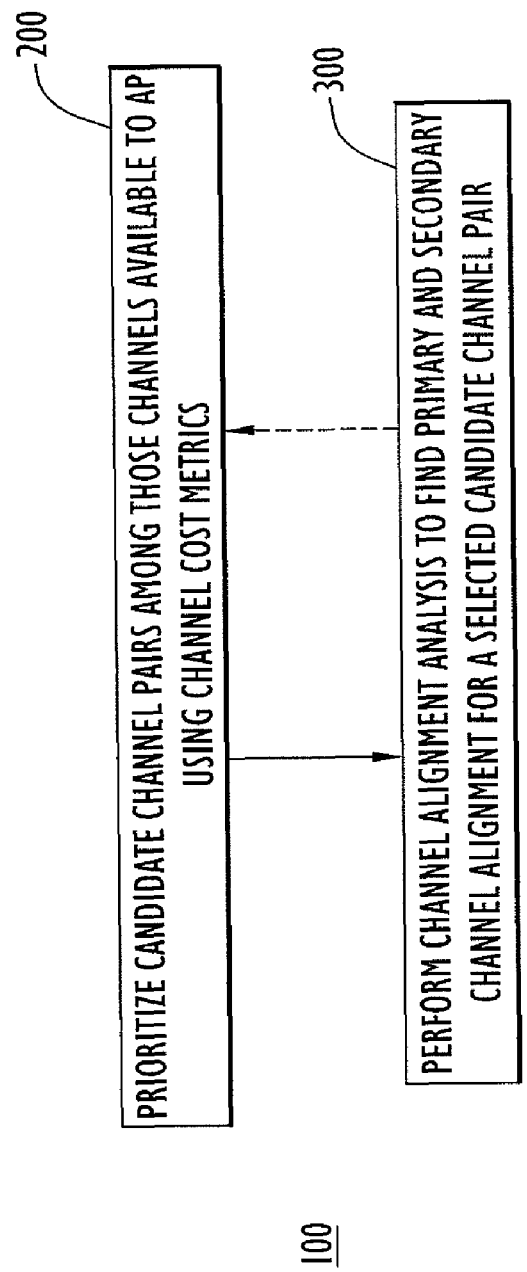
FIG. 2 shows an example of a flow chart depicting a method for selecting adjacent channels for a wider bandwidth operation mode.

Turning to FIG. 2, an example of a flow chart illustrating a method 100 for channel selection is described. FIG. 2 illustrates that there are two phases of the channel selection method 100. One phase is shown at 200 and involves prioritizing candidate channel pairs among those channels that are available to a device using one or more channel cost metrics that are described hereinafter. The other phase is shown at 300 and involves performing a channel alignment analysis to determine which of the channels in a selected candidate channel pair is to be the primary channel and which of the channels is to be the secondary channel. Phase 200 may be performed prior to phase 300 or phase 300 may be performed prior to phase 200 as indicated by the dotted arrow in FIG. 2. When phase 200 is performed prior to phase 300, a list of candidate channel pairs is created from those channels available to a wireless device, and the candidate channel pairs are arranged in a sequence of priority based on the channel cost metrics for the candidate channel pairs. Then, in phase 300, a candidate channel pair is selected from the list created in phase 200 for performing the channel alignment analysis. When phase 300 is performed prior to phase 200, channel alignment analysis is performed for the available channel pairs, and any channel pairs that are deemed candidates based on their channel alignment can then be analyzed for their channel cost metrics. Thus, the channel pair with the best channel cost metrics would be selected first for use by the wireless device seeking the wider bandwidth mode of operation.

Figure 3:
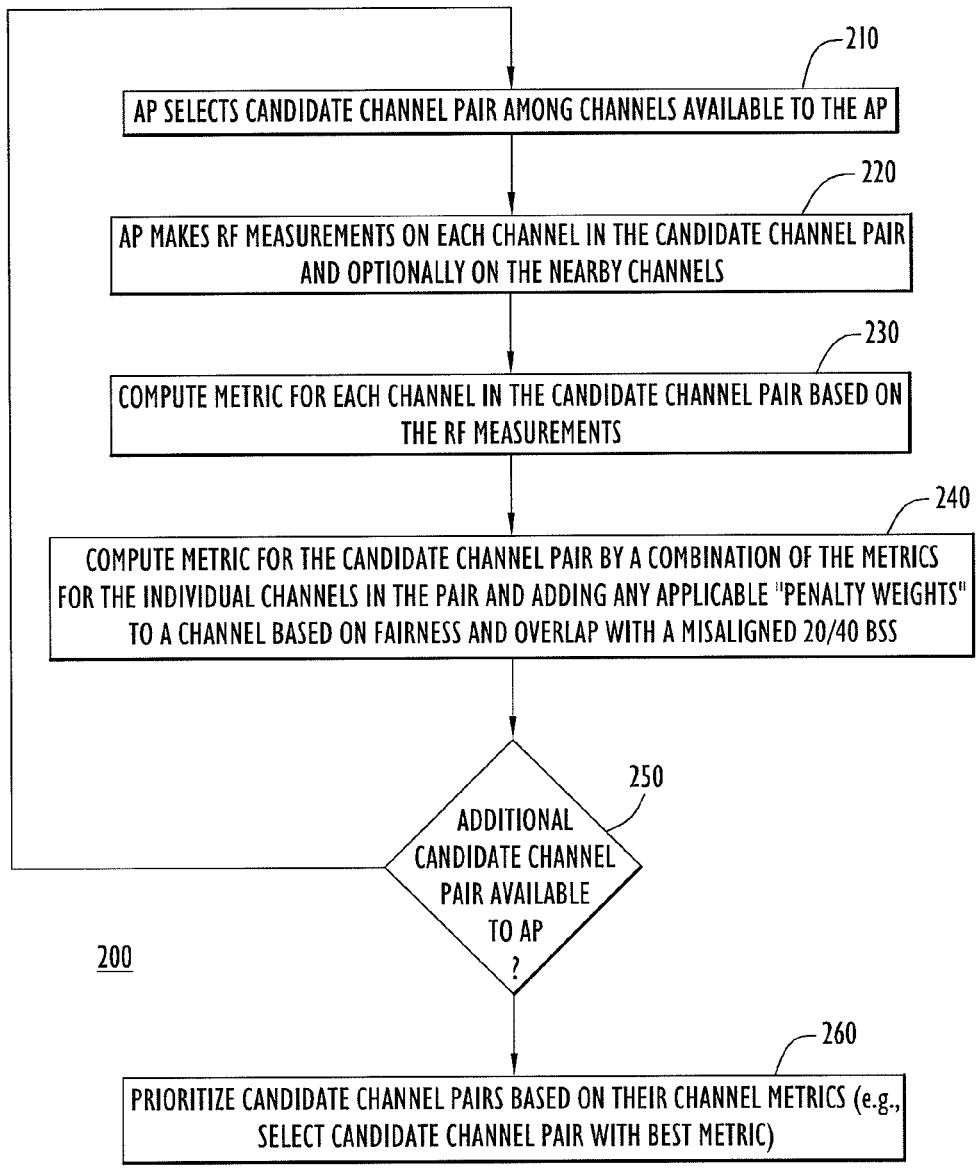
FIG. 3 shows an example of a flow chart depicting a method for prioritizing available channels that are available to a wireless network device for a wider bandwidth operation mode.

Turning now to FIG. 3, an example is shown for the method 200 of prioritizing of candidate channel pairs. Ultimately, when selecting a candidate channel pair for an AP's wider bandwidth operation mode, a channel cost metric is computed for each candidate channel pair. This metric can be calculated from a variety of radio frequency (RF) measurements that would affect a channel's quality for wider bandwidth (e.g., 40 MHz) operation mode. Examples of RF measurements for a candidate channel pair include:

1. The ambient noise floor in dBm.
2. Receive signal strength information (RSSI) strengths in dBm and average traffic loads of RF signals from known overlapping BSSs.
3. RSSI strengths in dBm and average traffic load of RF signals that the device under consideration would contribute to a candidate channel pair.
4. RSSI strengths in dBm and average duty cycles of unidentified RF signals detected on a candidate channel pair.
5. All of the foregoing measurements on nearby channels but attenuated appropriately based on their separations in frequency from the candidate channel pair under consideration.

The best network performance would be expected to be on the candidate channel pair with the smallest aggregate of these aforementioned RSSI measurements. Thus, one viable metric for a channel pair could simply be the numerical sum of these RSSI measurements on the two channels and weighted by the duty cycles or load. Then, after the metrics for all of the candidate channel pairs are computed for a particular wireless network device, the channel pair having the metric with the least value can be deemed to be the best for the wireless network device in its given location. An improved metric is a weighted sum of non-decreasing nonlinear mappings of the RSSI measurements.

The list of channels available for each wireless network device (e.g., an AP) may follow those available in the device's regulatory domain. The list of available candidate channels to assign to an wireless network device (e.g., AP) consists of pairs of channels and their permitted primary and secondary alignments.

Therefore, referring to the flow chart in FIG. 3, at 210, an AP selects a candidate channel pair from among those channels available to the AP. For example, an AP belonging to the US regulatory class 22 and 27 has the following candidate channel pairs available to it: {(36,40), (40,36), (44,48), (48, 44)}, where the first channel number in a pair is the primary channel and the second is the secondary channel, i.e., "(primary channel, secondary channel)".

At 220, the AP makes RF measurements on each channel in a selected one of the available candidate channel pairs, and optionally makes measurements on channels nearby the selected candidate channel pair. As explained above, a candidate channel pair is a pair of adjacent or contiguous channels, examples of which are depicted in FIG. 1. The RF measurements made at 220 may comprise one or more of the measurements described above, i.e., ambient noise floor, RSSI and average traffic loads, RSSI that the device under consideration would contribute to a candidate channel pair, RSSI and average duty cycles of unidentified RF signals on a candidate channel pair, and optionally all of the foregoing measurements on nearby channels.

The channel cost metric is to represent a quality of a candidate pair of channels as opposed to a metric for an individual channel. Therefore, one technique to compute the channel cost metric for a pair of channels is to compute the channel cost metric for each individual channel in a candidate channel pair and then combine the two channel cost metrics to yield a metric for the candidate channel pair. For example, the channel cost metrics for a candidate channel pair may comprise a weighted average of the channel cost metrics of the individual channels in the candidate channel pair.

Thus, at 230, the channel cost metric is computed for each channel in the selected candidate channel pair based on the RF measurements made for each channel at 220. Next, at 240, the channel cost metric for the candidate channel pair is derived by computing a combination of the channel cost metrics for the individual channels in the candidate channel pair.

When computing the channel cost metric for a candidate channel pair at 240, the cost metric for each channel in the pair may be assigned a "penalty" based on fairness and any overlap with a misaligned 20/40 BSS. How the channel metrics for each individual channel are weighted can be based on a combination of many properties of the AP under consideration. Because a 20/40 MHz BSS can switch back and forth between transmissions of 40 MHz on both channels and 20 MHz on the primary channel, it is reasonable to assign the weight to the primary channel's 20 MHz cost metric according to the portion of time the 20/40 MHz BSS transmits in the single channel 20 MHz mode. This can be expected to be proportional to the number of 20 MHz clients in the BSS for the AP under consideration. Accordingly, the weight assigned to a secondary channel's cost metric for a candidate channel pair would be one minus the normalized weight assigned to the primary channel for that candidate channel pair.

For example, analysis of IEEE 802.11n's 20/40 MHz BSS coexistence rules reveals that an unfairness weighting may be imposed for those 20 MHz BSS's that share the secondary channel of a 20/40 MHz BSS. Accordingly, one weighting technique involves one that penalizes a 40 MHz channel pair if a candidate channel pair results in the secondary channel of a candidate channel pair for a 20/40 MHz BSS being shared with 20 MHz BSS's. This may be implemented by assigning a penalty to the channel in the candidate channel pair that would serve as a secondary channel when computing the channel cost metric for that channel pair based on the RSSI of the overlapping 20 MHz BSS's.

As another example, any two 20/40 MHz BSSs that have their primary and secondary channels misaligned would also suffer from interferences incurred from the "flaws" of the coexistence protocol in the 802.11n amendment. Therefore, the channel cost metric for an alignment of channels of a candidate channel pair may be penalized if it overlaps with the channel alignment with another 20/40 MHz BSS.

The values of these penalty weights can be determined via simulations or empirical methods deemed appropriate.

After the channel cost metric is computed for a candidate channel pair at 240, it is determined whether there are additional candidate channel pairs available to the AP at 250. If so, then the process of 210-240 repeats for another candidate channel pair. If not, then at 260, after the channel cost metric is computed for all candidate channel pairs available to an AP, the candidate channel pairs may be prioritized based on their respective channel cost metrics. For example, the candidate channel pair with the least channel cost metric would be the highest priority candidate channel pair, and so on.

The foregoing weighting technique is only an example and it should be understood that other techniques may be performed without departing from the scope and spirit of the techniques described herein. There are numerous variations to use of the aforementioned RF signal measurements. For example, rather than simply computing the numerical sums of these RF measurement values, a different metric computation may be performed by considering that when the RSSI of an interferer is above a certain threshold, an AP would defer to the interferer, thus avoiding any unnecessary collisions with the interferer.

A Channel Cost Metric Example

The following is an example of a channel cost metric computation that adds the RSSI strengths weighted by their duty cycles. In this example, the candidate channel pairs are the channel pairs (44, 48) and (48, 44) and the RF measurements made on each channel are summarized by table 3 below.

TABLE 3

| RF Measurement | Channel 44 | Channel 48 |
| --- | --- | --- |
| Noise floor | −90 dBm | −100 dBm |
| Non-802.11 RF signal RSSI | −50 dBm | −52 dBm |
| Non-802.11 RF signal duty cycle | 50% | 10% |
| No. of 20 MHz BSS present on this channel | 1 | 1 |
| No. of 40 MHz BSSs using this channel as secondary | 2 | 1 |

For the sake of simplicity, it is assumed in this example that there is no RF activity on any channels near channels 44 and 48. In addition, for the example, the penalty for a 20 MHz BSS on a secondary channel of a candidate channel pair is 3 dB per 20 and the penalty is 1.5 dB for misaligned 40 MHz channels with respect to another 20/40 MHz BSS. If the channel cost metric of the primary channel is weighted to be three times that of the secondary channel, then the following two 40 MHz channel cost metrics computed for this example are:

Cost metric for the candidate channel pair (44,48)=0.75*(Cost metric for channel 44 as primary)+0.25*(Cost metric for channel 48 as secondary)=0.75*(−90+−50*0.5+0*3+2*1.5)+0.25*(−100+−52*0.1+1*3+0*1.5)=−109.55 dBm.

Cost metric for candidate channel pair (48,44)=0.75*(Cost metric for channel 48 as primary)+0.25*(Cost metric for channel 44 as secondary)=0.75*(−100+−52*0.1+0*3+1*1.5)+0.25*(−90+−50*0.5+1*3+0*1.5)=−105.775 dBm.

If the selection criterion for better 40 MHz performance and fairness is indicated by the smaller of the metric values, then under this rule, channel pair (44,48) would be recommended as the highest priority candidate channel pair for the 20/40 MHz BSS among the available channels for this AP. Another possible implementation can also use these RF measurements to determine a numerical value that is representative of the performance of the device on a set of candidate channels. For example, based on the carrier sensing detection threshold specified by a wireless standard that the device complies to or based on empirical measurements, one can map or calculate based on these measurements the expected network throughput of a device on each candidate channel. Then the selection criterion would based on the maximum of the computed performance values.

Figure 4:
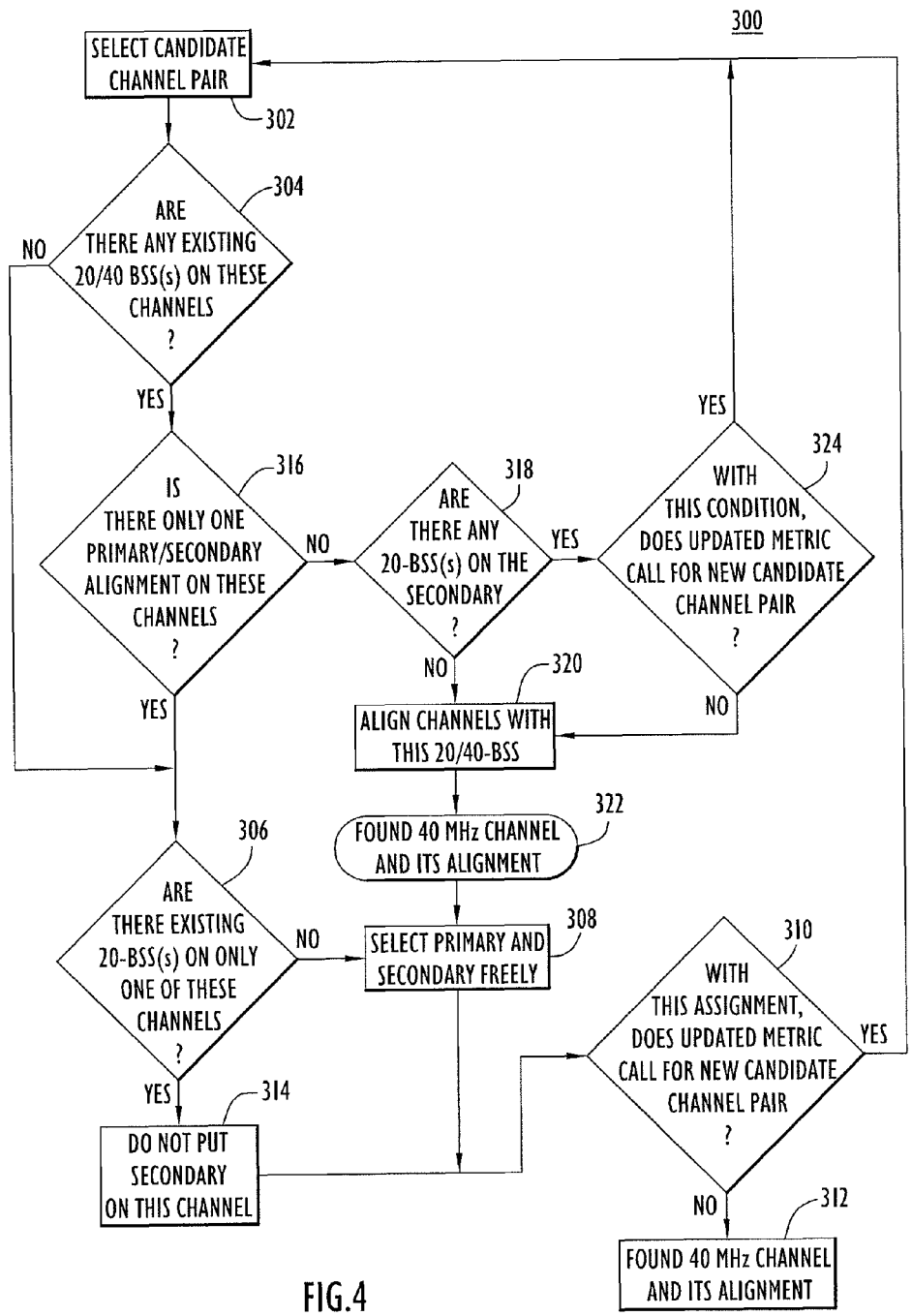
FIG. 4 shows an example of a flow chart depicting a method for performing alignment of primary and secondary channels for a selected pair of adjacent channels.

Turning now to FIG. 4, the channel alignment methodology 300 is described in accordance with an example embodiment. While, for purposes of simplicity of explanation, the methodology of FIG. 4 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect the example embodiment. As will be described herein, the methodology is suitably adapted to be implemented in hardware, software, or a combination thereof. It should also be appreciated that methodology 300 is suitable to be implemented by an access point (AP), such as a self-configuring AP, by a controller, or by both (e.g. the self-configuring initially selects channels which the controller may later re-assign).

At 302, a candidate channel pair is selected. For example, the candidate channel pair that is given the highest priority by the method 200 may be selected. As explained above in conjunction with FIG. 3, the candidate channel pairs may be prioritized based on identified interfering sources, such as other transceivers or external (wireless other-network) interferers, or based upon the energy from their transmissions. For a 20/40 BSS, a pair of 20 MHz channels are selected.

At 304, a determination is made whether there is another 20/40 BSS operating on the same channels as the channels of the selected candidate channel pair under analysis. If it is determined that no other 20/40 BSS is operating on the same channels (NO) at 304, then at 306 it is determined whether a 20 MHz BSS is operating on only one of the channels of the candidate channel pair under analysis. If it is determined that no 20 MHz BSS is operating on only one of the channels in the candidate channel pair (NO) at 306, then the process proceeds to 308 where the primary and secondary channels can be freely selected. That is, at 306, since no 20 MHz BSS is operating on either channel and no 20/40 MHz BSS is operating on either of the channels in the candidate channel pair, then the primary and secondary channels can be freely selected from the candidate channels. That is, it does not matter which of the channels in the candidate channel pair is the primary channel or which of the channels in the candidate channel pair is the secondary channel.

At 310, it is determined whether the network performance using the selected candidate channel pair and its primary-secondary channel alignment is acceptable or should a new candidate channel pair be selected. If the network performance is acceptable (YES), an acceptable 40 MHz channel and alignment have been found as illustrated at 312 and method 300 stops. On the other hand, if the network performance is not acceptable using the selected candidate channel pair and the primary-secondary channel alignment, then the process goes back to 302 where another candidate channel pair is selected, i.e., the candidate channel pair that has the next highest priority among those identified in method 200 (FIG. 3).

The channel alignment analysis of method 300 can be periodically performed to determine if the channel selection and alignment for a channel pair should be changed. Method 300 can be executed in response to changes in the network environment, e.g. a new BSS is added, or a BSS is no longer operating, changes in interference and/or noise, or the method 300 may be periodically performed at predetermined timed intervals.

If at 306 a 20 MHz BSS is found on one of the candidate channels (YES), then at 314 the channels of the candidate channel pair are aligned so that the secondary channel is not on the same channel as the 20 MHz BSS. Then at 310, it is determined whether the network performance using the selected channels is acceptable. If the network performance is acceptable (YES), an acceptable 40 MHz channel and alignment have been found and method 300 stops. Otherwise, the process proceeds to 302 where another candidate channel pair is selected.

If at 304 it is determined that a 20/40 BSS is operating on the candidate channels (YES), at 316 a determination is made whether there is more than one primary-secondary channel alignment on those candidate channels. That is, when an AP chooses to start a 20/40 MHz BSS that occupies the same two channels that an existing 20/40 MHz BSS occupies, then subject to one caveat, the AP selects the primary channel of the new 20/40 MHz BSS to be the same as the primary channel of the existing 20/40 MHz BSS and the secondary channel of the new 20/40 MHz BSS to be the same of the existing 20/40 MHz BSS. The caveat is that when there is more than one existing 20/40 MHz BSS on the same channels as the candidate channels, where at least one existing 20/40 MHz BSS has a different primary-secondary channel alignment than another existing BSS 20/40 MHz BSS. Thus, said another way, at 316 a determination is made whether there only one primary-secondary channel alignment on the channels associated with the candidate channel pair under analysis.

If at 316, it is determined that there is more than one primary-secondary channel alignment on the channels of the candidate channel pair (NO), then at 318 it is determined whether there are any 20 MHz BSS on the secondary channel of any existing 20/40 MHz BSS. If it is determined at 318 that there are no 20 MHz BSS on the secondary channel of an existing 20/40 MHz BSS (NO), then at 320 the channels of the candidate channel pair are aligned with the 20/40 MHz BSS whose secondary channel is not shared with any 20 MHz BSS. Consequently, the primary and secondary channels of the candidate channel pair are aligned with an existing 20/40 MHz BSS whose secondary channel is not shared with an existing 20 MHz BSS. At 322, it is determined that a 20/40 MHz channel and alignment has been found and method 300 stops. However, the network performance can be analyzed, for example as at 310, before determining whether to stop method 300. If the performance is acceptable, then at 322 method 300 stops; otherwise, new channels are selected at 302.

The determination made at 306 and 318 may be omitted in cases in which the existence of 20 MHz BSS's are not a concern.

If at 318 a 20 MHz BSS is found on the secondary channel of an existing 20/40 MHz BSS (YES), then the process proceeds to 324 where it is determined whether this condition is acceptable or whether a new candidate channel pair should be selected. For example, if the RSSI is low enough that the existing 20 MHz BSS does not interfere with an AP operating on the selected candidate channel pair and the AP operating on the selected candidate channel pair does not interfere with the existing 20 MHz BSS then the co-existence of the 20 MHz BSS on the secondary channel of the selected candidate channel pair can be acceptable. In an example embodiment, a power level for an AP operating on the candidate channel pair can be varied so as not to interfere with the existing 20 MHz BSS. Thus, if at 324 the existence of a 20 MHz BSS operating on the secondary channel of the candidate channel pair is acceptable (YES), then at 320 the candidate channels are aligned, a 20/40 MHz channel alignment has been found at 322 and the method 300 stops. However, in particular embodiments (not shown), the performance can be analyzed, for example as done at 310, before determining whether to stop method 300. If the performance is acceptable, then at 322 method 300 stops; otherwise, new channels are selected at 302.

If at 324 it is determined that an existing 20 MHz BSS operating on the secondary channel of the candidate channel pair is not acceptable (NO), then new candidate channels are selected at 302. Method 300 can be repeated until suitable channels and channel alignment are discovered.

If it is determined that there is only one primary-secondary channel alignment at 316 (YES), then the process proceeds to 306 where it is determined whether there is an existing 20 MHz BSS that is operating on only one of the channels of the candidate channel pair. If at 306 a 20 MHz BSS is found on only one of the candidate channels (YES), then at 314 the channels are aligned so that the secondary channel is not on the same channel as the 20 MHz BSS. At 310, it is determined whether the network performance using the selected channels is acceptable. If the network performance is acceptable (YES), an acceptable 40 MHz channel and alignment have been found and method 300 stops.

It should be noted that method 300 can be modified in response to different priorities or conditions. For example, if it is desired that no secondary channel operate on the same channel as a 20 MHz BSS, such as a legacy 20 MHz BSS, then 306 and/or 318 can be performed earlier and new channels can be selected at step 302 immediately in response to discovering a 20 MHz BSS on the secondary channel. It is intended that this application encompass all such combinations and permutations. It should also be noted that method 100 is illustrating using two channels; however, those skilled in the art should readily appreciate that method 100 can be expanded to configure any number of physically realizable channels, e.g., three or more channels. A two channel example is described herein for ease of illustration.

In summary, the methodology 300 described in connection with FIG. 4 may be used by an AP or a controller that is coupled to the AP that is operable to select the AP's operating channels according to the following rules for selecting primary and secondary channels:

(1) If there is an existing 20/40 MHz BSS (a BSS allowing both 20 MHz and 40 MHz) on the chosen two channels, then the AP ensures that the primary channel of the new BSS is identical to the primary channel of any existing 20/40 MHz BSS and that the secondary channel of the new 20/40 MHz BSS is identical to the secondary channel of any existing 20/40 MHz BSS(s), unless the AP discovers that on these two channels is another existing 20/40 MHz BSS with different primary and secondary channels or another existing 20 BSS not on the primary channel.

(2) The AP shall use a pair of channels such that the secondary channel corresponds to a channel on which no Beacons from any existing 20 MHz BSS(s) have been detected.

(3) If the conditions of rule 2 cannot be met, then the AP shall use a pair of channels such that the secondary channel corresponds to a channel on which no Beacons from any existing 20 MHz BSS(s) above a predetermined RSSI threshold, for example −90 dBm have been detected.

(4) If the conditions of rule 3 cannot be met, then the AP can use a pair of channels as long as the conditions of rule 1 are satisfied.

When satisfying the conditions of rule 1, if the AP discovers that on its chosen two channels there are existing 20/40 MHz BSSs with different primary and secondary channels, then the AP should use a pair of channels such that the secondary channel of the 20/40 MHz BSS corresponds to the channel of the weakest detected beacon (as determined by RSSI) or the channel with the least medium time consumed by traffic of all of the channels that can be used as a secondary channel for the AP's regulatory class. An AP does not start a 20 MHz BSS in 5 GHz that is a secondary channel of any 20/40 MHz BSS.

The concepts described above to impose fairness via cost metrics among BSSs can also be used in assigning a 20 MHz AP to a channel in order to coexist with 20/40 MHz BSSs. That is, the flowcharts of FIGS. 2-4 can be modified so that the priority is placed on protecting 20 MHz (legacy) BSSs. A non-wider bandwidth mode device may employ the concepts depicted in FIGS. 2-4 when selecting which channel to use in the presence of devices operating in a wider bandwidth mode. In this case, the metrics are computed for RF channels in a frequency band where there is at least one existing wireless network operating using at least two contiguous RF channels. Assignment of a wireless network to one of the RF channels is made based on the metrics and so as to coexist with the existing wireless network that operates using at least two contiguous RF channels, in a manner that attempts to maximize performance of the wireless networks.

FIG. 5 is block diagram of a computer system 400 upon which an example embodiment can be implemented. Computer system 400 includes a bus 402 or other communication mechanism for communicating information and a processor 404 coupled with bus 302 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

An aspect of the example embodiment is related to the use of computer system 400 for selecting channels for a wider bandwidth operation mode. According to an example embodiment, selecting channels for a wide spectral bandwidth system is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 404 for execution. Such a medium may take many forms, including but not limited to non-volatile media, volatile media, and transmission media. Non-volatile media include for example optical or magnetic disks, such as storage device 410. Volatile media include dynamic memory such as main memory 406. Transmission media include coaxial cables, copper wire and fiber optics, including the wires that comprise bus 402. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a network, such as a WLAN. For example, communication interface 418 may be a wireless transceiver or a network card such as an Ethernet card, in other embodiments communication interface 418 may be an integrated services digital network (ISDN) card or a modem to provide a data communication connection to a corresponding type of telephone line. In any such implementation, communication interface 418 sends and receives electrical, electromagnetic, or optical signals that carry digital data streams representing various types of information.

Computer system 400 can send messages and receive data, including program codes, through communication interface 418. In accordance with an example embodiment, one such downloaded application provides for selecting channels as described herein. The received code may be executed by processor 404 as it is received, and/or stored in storage device 410, or other non-volatile storage for later execution.

Figure 6:
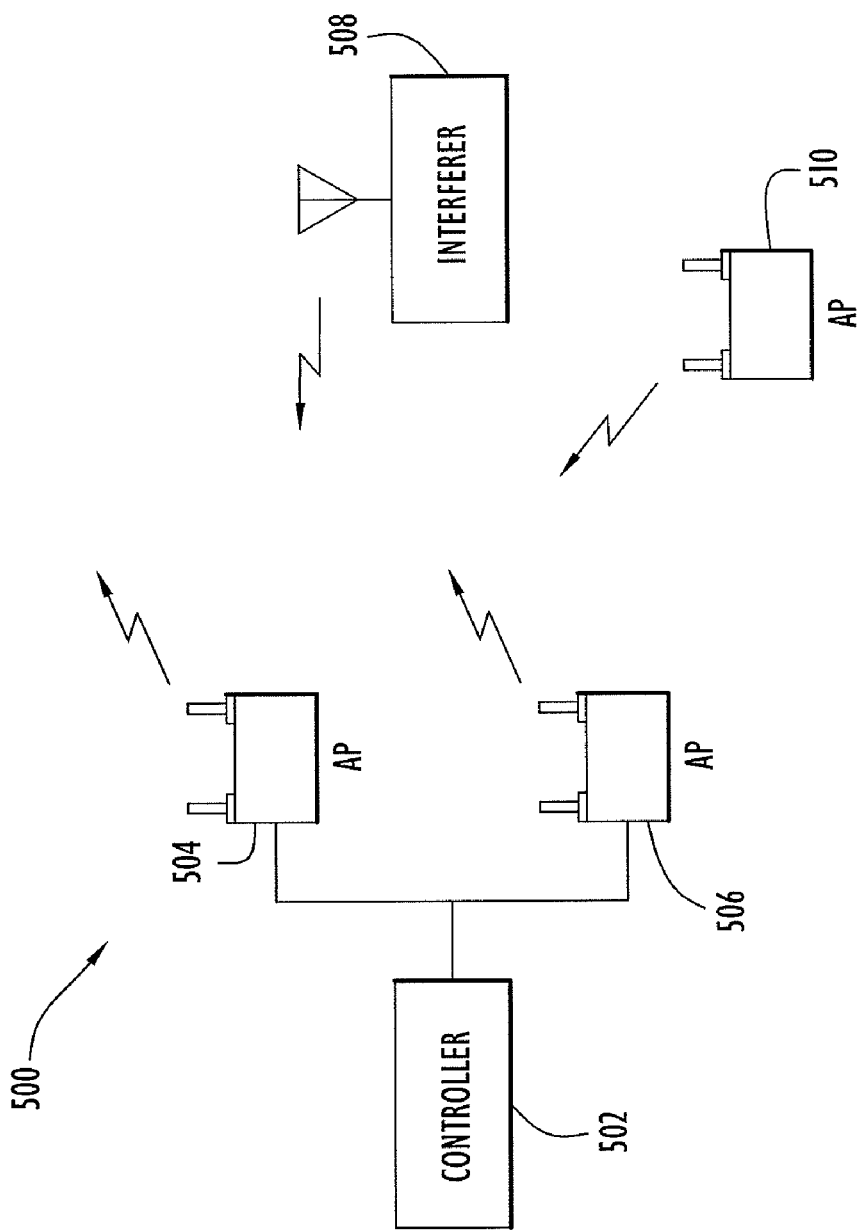
FIG. 6 illustrates an example of a wireless network in which an example embodiment may be implemented.

FIG. 6 illustrates an example network 500 upon which an example embodiment may be implemented. Network 500 comprises a controller 502, in data communication with APs 504, 506. The communication link between controller 502 and APs 504, 506 may be suitably a wired, wireless and/or any combination of wired and wireless links. In an example embodiment, controller 502 acquires data from APs 504, 506 about available channels, such as other APs detected, for example AP 510 which may be a rogue AP or an AP operating on a different network. APs 504, 506 may also acquire data about interfering sources or noise, such as for example from interferer 508. Such data about interfering sources or noise may suitably comprise data indicating which channels are affected and/or the intensity of the interference. Based on this data, controller 502 can select candidate channels for APs 504, 506. In particular embodiments, controller 502 also aligns the channels, for example by using the rules or methods described herein.

In one example, APs 504, 506 may initially select and align operating channels. Once operational, controller 502 may verify the selected channels and channel alignment. Controller 502 may subsequently select new channels and/or new channel alignments for one or more of APs 504, 506. Controller 502 communicates the new channels and/or alignments to AP 504 and/or 506 which are responsive to change to the new channels and/or alignment.

The concepts described above are example embodiments. The concepts described herein may be embodied in other specific forms without departing from the spirit or essential characteristics thereof. The foregoing embodiments are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
computing, with a processor, a plurality of channel cost metrics for one or more candidate sets of radio frequency (RF) channels, wherein each candidate set of RF channels comprises two or more contiguous RF channels in a frequency band that are available for use by a wireless network in a wider bandwidth mode of operation that combines bandwidth of the contiguous RF channels, wherein the channel metrics are based on activity from wireless devices in each of the candidate sets of RF channels;
selecting, based on one or more of the channel cost metrics, a particular set of RF channels for use by the wireless network in the wider bandwidth mode of operation, wherein the particular set of RF channels comprises a plurality of contiguous channels; and
selecting, based on one or more of the channel cost metrics, one or more of the plurality of contiguous channels as a primary RF channel and one or more of the plurality of contiguous channels as a secondary RF channel both for use by the wireless network in the wider bandwidth mode, wherein the primary channel is one or more RF channels that are the lowest denomination of RF channels that a device uses when it is not operating in the wider bandwidth mode and a secondary channel is one or more RF channels adjacent to the primary channel.

2. The method of claim 1, wherein computing a plurality of channel cost metrics comprises:
computing, for each individual channel in a candidate set of RF channels, a metric based on one or more of: ambient noise floor, receive signal strength from other wireless networks, receive signal strength that would be contributed by the wireless network on the candidate set of channels, and receive signal strength associated with activity of unidentified RF signals.

3. The method of claim 1, wherein selecting the particular set of RF channels comprises:
selecting the particular set of RF channels as that set of channels whose channel cost metrics indicate a least amount of interference to existing wireless devices operating in the set of RF channels or whose channel access metrics indicate the best performance in the set of channels.

4. The method of claim 1, wherein selecting one or more of the plurality of contiguous channels as a primary RF channel and one or more of the plurality of contiguous channels as a secondary RF channel comprises:
determining whether there is only one other existing wireless network operating in the wider bandwidth mode on the particular set of RF channels, and if there is more than one other existing wireless network operating in the wider bandwidth mode on the particular set of RF channels, then further determining whether there are any wireless networks operating on an RF channel that is a secondary channel of an existing wireless network operating in the wider bandwidth mode.

5. The method of claim 4, further comprising:
aligning the primary and secondary channels of the particular set of RF channels for the wireless network with primary and secondary channels of an existing wireless network whose secondary channel is not also used by an existing wireless network.

6. The method of claim 4, wherein when it is determined that there is only one other wireless network operating in the wider bandwidth mode in the particular set of RF channels, further comprising:
determining whether there are any existing wireless networks operating on only one of the RF channels in the particular set of channels.

7. The method of claim 6, further comprising:
designating the RF channels in the particular set of RF channels as primary and secondary channels for the wireless network without restriction when it is determined that there is not an existing wireless network operating on only one of the RF channels in the particular set.

8. The method of claim 6, when it is determined that there is an existing wireless network operating on only one of the RF channels in the particular set, further comprising:
designating the RF channels in the particular set of RF channels for the wireless network such that the secondary channel of the wireless network does not coincide with the RF channel used by the existing wireless network.

9. The method of claim 4, when it is determined that there is one or more existing wireless network operating on the RF channels in the particular set, further comprising:
designating the RF channels in the particular set of RF channels as primary and secondary channels for the wireless network in a manner that minimizes interferences to the existing wireless network.

10. The method of claim 1, further comprising:
obtaining measurements of received RF energy for each individual channel in the one or more candidate sets of RF channels;
computing channel cost metrics for the individual channels in each of the one or more sets of candidate RF channels;
computing a channel cost metric for each set of candidate RF channels by combining the channel cost metrics computed for the individual channels in the corresponding set of channels; and
prioritizing the one or more candidate sets of RF channels based on the channel cost metrics for each of the sets of candidate RF channels.

11. The method of claim 10, wherein computing a channel cost metric for each of the one or more candidate sets of RF channels further comprises:
assigning a weight to the channel cost metrics for each of the individual channels in a set of channels based on one or more factors that penalizes a channel in a set of candidate channels that would serve as a secondary channel when computing the metric for that set of channels based on the received signal strength of a wireless network operating on that channel.

12. The method of claim 1, wherein selecting the particular set of RF channels comprises:
selecting a particular set of RF channels as that set of channels whose metrics indicate a least amount of interference to existing wireless devices.

13. The method of claim 1, computing a plurality of channel cost metrics comprises:
computing a numerical sum of receive signal strength measurements made on each channel in a set of candidate RF channels, where each receive signal strength measurement is weighted by a duty cycle or load in the corresponding channel.

14. The method of claim 1, computing a plurality of channel cost metrics comprises:
computing a numerical value that is representative of the performance of a device on a set of candidate RF channels, and where performance comprises at least network throughput of the device.

15. An apparatus comprising:
a radio transceiver that transmits and receives signals in a radio frequency channel;
a modem connected to the radio transceiver that baseband modulates signals to be transmitted according to a communication protocol and demodulates received signals according to the communication protocol; and
a processor connected to the modem that controls the modem and the radio transceiver; wherein at least one of the processor is configured to:
compute a plurality of channel cost metrics for one or more candidate sets of radio frequency (RF) channels, wherein each candidate set of RF channels comprises two or more contiguous RF channels in a frequency band that are available for use by a wireless network in a wider bandwidth mode of operation that combines bandwidth of the contiguous RF channels, wherein the channel metrics are based on activity from wireless devices in each of the candidate sets of RF channels;
select, based on one or more of the channel cost metrics, a particular set of RF channels for use by the wireless network in the wider bandwidth mode of operation, wherein the particular set of RF channels comprises a plurality of contiguous channels;
select, based on one or more of the channel cost metrics, one or more of the plurality of contiguous channels as a primary RF channel and one or more of the plurality of contiguous channels as a secondary RF channel both for use by the wireless network in the wider bandwidth mode.

16. The apparatus of claim 15, wherein to compute a plurality of channel cost metrics, the processor is configured to:
compute, for each individual channel in a candidate set of RF channels, a metric based on one or more of: ambient noise floor, receive signal strength from other wireless networks, receive signal strength that would be contributed by the wireless network on the candidate set of channels, and receive signal strength associated with activity of unidentified RF signals.

17. The apparatus of claim 15, wherein to select the particular set of RF channels, the processor is configured to:
select the particular set of RF channels as that set of channels whose channel cost metrics indicate a least amount of interference to existing wireless devices operating in the set of RF channels or whose channel access metrics indicate the best performance in the set of channels.

18. The apparatus of claim 15, wherein to select one or more of the plurality of contiguous channels as a primary RF channel and one or more of the plurality of contiguous channels as a secondary RF channel, the processor is configured to:
determine whether there is only one other existing wireless network operating in the wider bandwidth mode on the particular set of RF channels, and if there is more than one other existing wireless network operating in the wider bandwidth mode on the particular set of RF channels, then further determine whether there are any wireless networks operating on an RF channel that is a secondary channel of an existing wireless network operating in the wider bandwidth mode.

19. The apparatus of claim 18, wherein the processor is further configured to:
align the primary and secondary channels of the particular set of RF channels for the wireless network with primary and secondary channels of an existing wireless network whose secondary channel is not also used by an existing wireless network.

20. The apparatus of claim 18, wherein the processor is further configured to:
determine whether there are any existing wireless networks operating on only one of the RF channels in the particular set of channels.

21. The apparatus of claim 20, wherein the processor is further configured to:
designate the RF channels in the particular set of RF channels as primary and secondary channels for the wireless network without restriction when it is determined that there is not an existing wireless network operating on only one of the RF channels in the particular set.

22. The apparatus of 20, when it is determined that there is an existing wireless network operating on only one of the RF channels in the particular set, the processor is further configured to:
designate the RF channels in the particular set of RF channels for the wireless network such that the secondary channel of the wireless network does not coincide with the RF channel used by the existing wireless network.

23. The apparatus of claim 18, when it is determined that there is one or more existing wireless network operating on the RF channels in the particular set, the processor is configured to:
designate the RF channels in the particular set of RF channels as primary and secondary channels for the wireless network in a manner that minimizes interferences to the existing wireless network.

24. One or more non-transitory computer readable storage media encoded with software comprising computer executable instructions and when the software is executed operable to:
compute a plurality of channel cost metrics for one or more candidate sets of radio frequency (RF) channels, wherein each candidate set of RF channels comprises two or more contiguous RF channels in a frequency band that are available for use by a wireless network in a wider bandwidth mode of operation that combines bandwidth of the contiguous RF channels, wherein the channel metrics are based on activity from wireless devices in each of the candidate sets of RF channels;
select, based on one or more of the channel cost metrics, a particular set of RF channels for use by the wireless network in the wider bandwidth mode of operation, wherein the particular set of RF channels comprises a plurality of contiguous channels; and
select, based on one or more of the channel cost metrics, one or more of the plurality of contiguous channels as a primary RF channel and one or more of the plurality of contiguous channels as a secondary RF channel both for use by the wireless network in the wider bandwidth mode, wherein the primary channel is one or more RF channels that are the lowest denomination of RF channels that a device uses when it is not operating in the wider bandwidth mode and a secondary channel is one or more RF channels adjacent to the primary channel.

25. The computer readable storage media of claim 24, wherein the instructions operable to compute a plurality of channel cost metrics comprise instructions operable to:
compute, for each individual channel in a candidate set of RF channels, a metric based on one or more of: ambient noise floor, receive signal strength from other wireless networks, receive signal strength that would be contributed by the wireless network on the candidate set of channels, and receive signal strength associated with activity of unidentified RF signals.

26. The computer readable storage media of claim 24, wherein the instructions operable to select the particular set of RF channels comprise instructions operable to:
select the particular set of RF channels as that set of channels whose channel cost metrics indicate a least amount of interference to existing wireless devices operating in the set of RF channels or whose channel access metrics indicate the best performance in the set of channels.

27. The computer readable storage media of claim 24, wherein the instructions operable to select one or more of the plurality of contiguous channels as a primary RF channel and one or more of the plurality of contiguous channels as a secondary RF channel comprise instructions operable to:
determine whether there is only one other existing wireless network operating in the wider bandwidth mode on the particular set of RF channels, and if there is more than one other existing wireless network operating in the wider bandwidth mode on the particular set of RF channels, then further determining whether there are any wireless networks operating on an RF channel that is a secondary channel of an existing wireless network operating in the wider bandwidth mode.

* * * * *